Aug. 23, 1960 P. KLAMP 2,949,862
OVERHEAD TRUCK PUSHER CONVEYOR
Filed Dec. 5, 1955 6 Sheets-Sheet 1
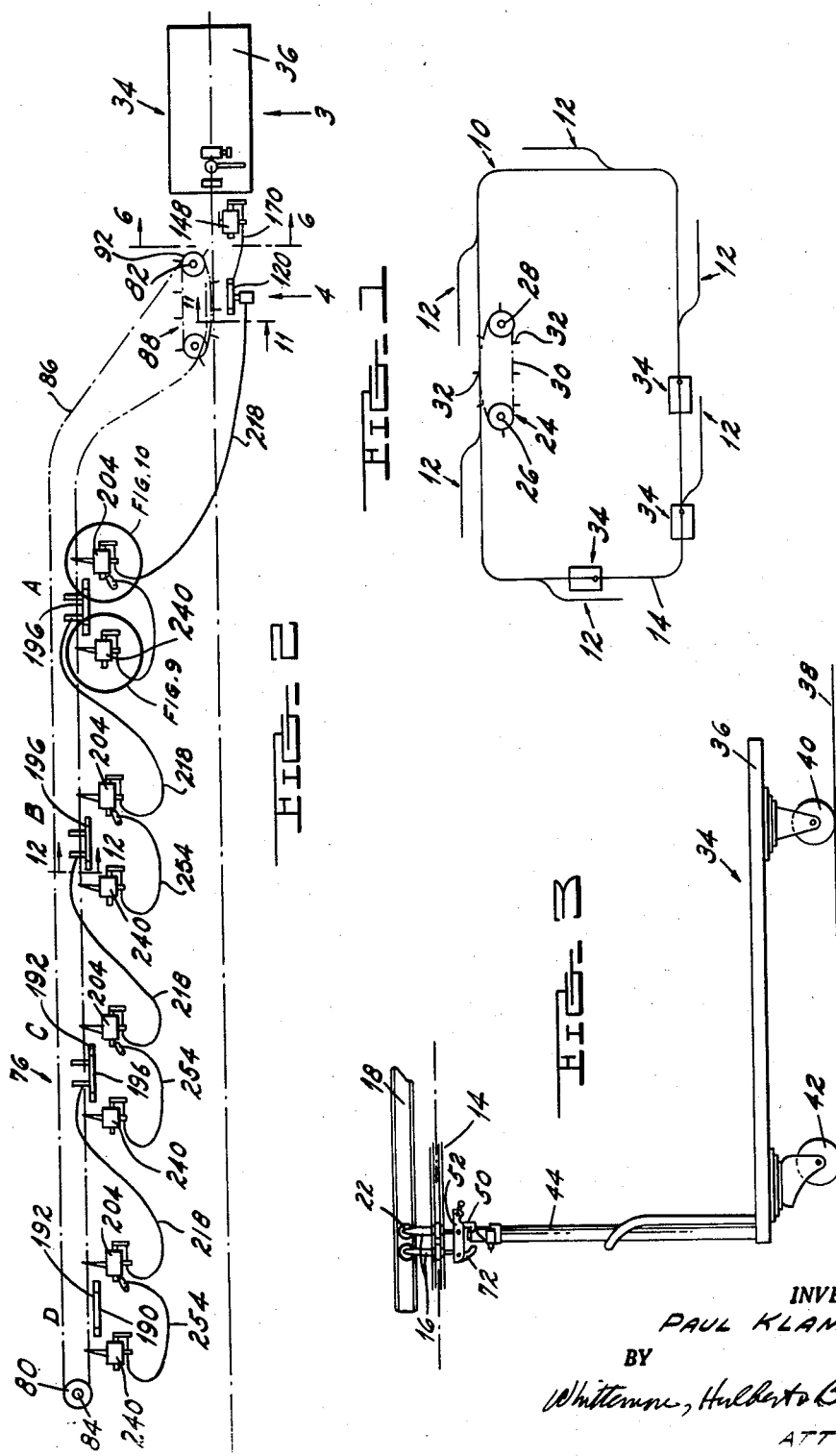
INVENTOR.
PAUL KLAMP
BY
Whittemore, Hulbert & Belknap
ATTORNEYS

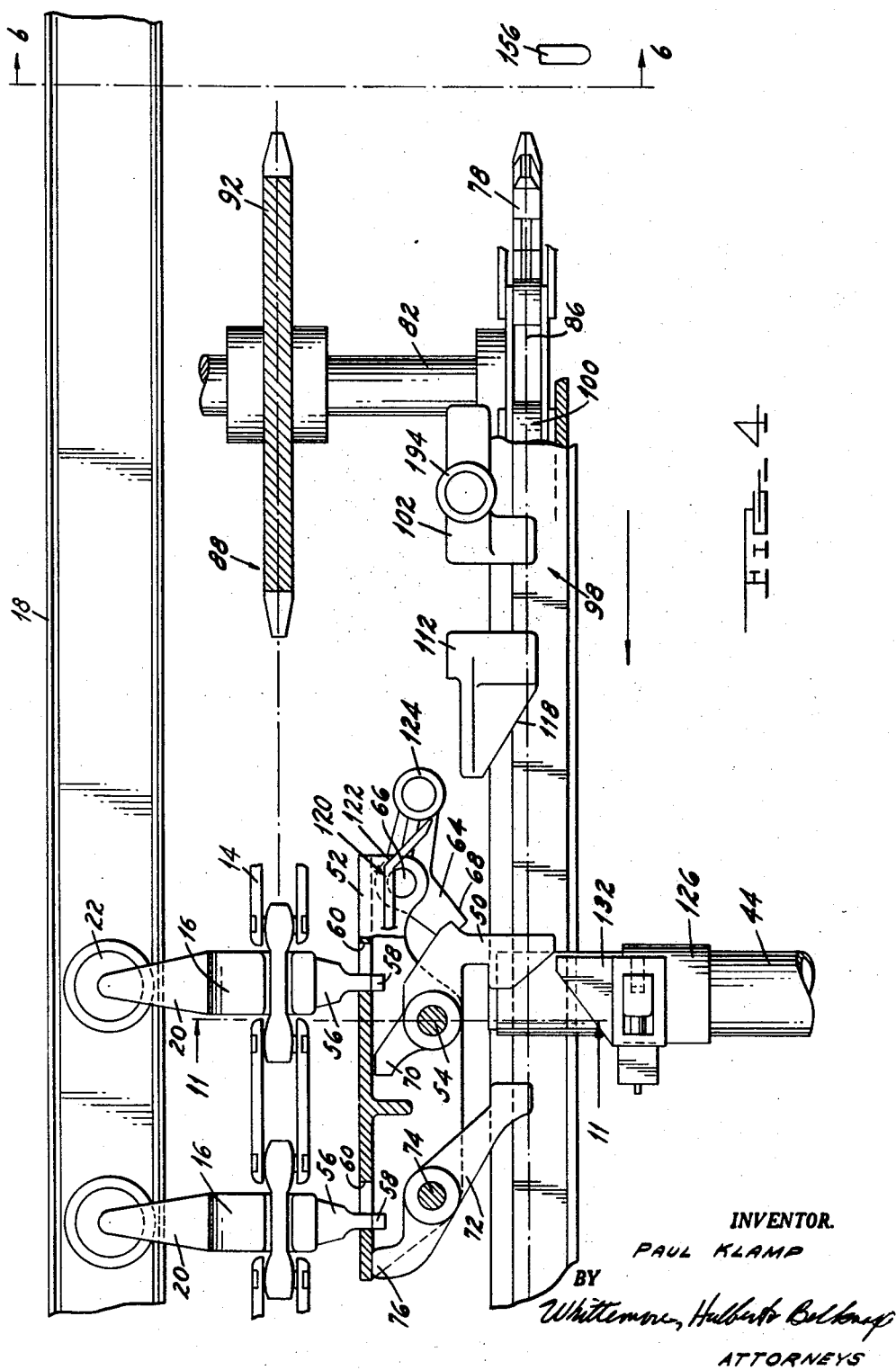

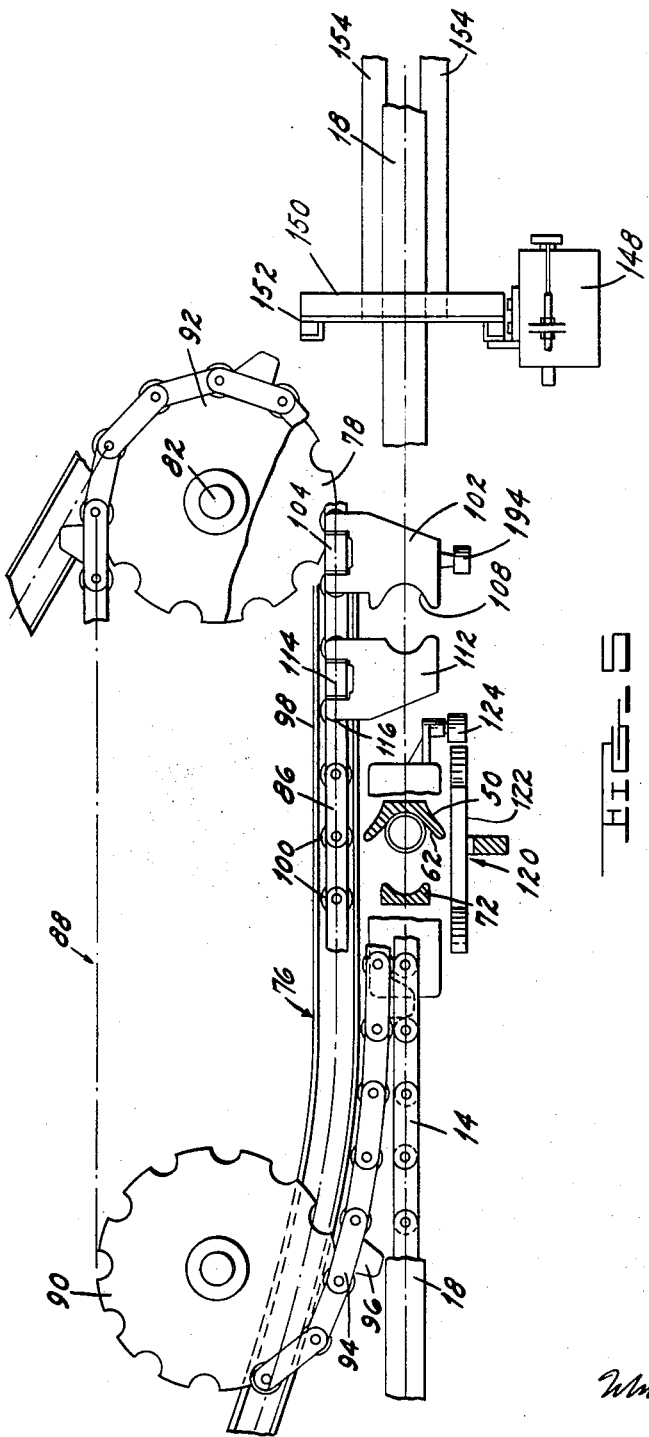

Aug. 23, 1960    P. KLAMP    2,949,862
OVERHEAD TRUCK PUSHER CONVEYOR
Filed Dec. 5, 1955    6 Sheets-Sheet 4
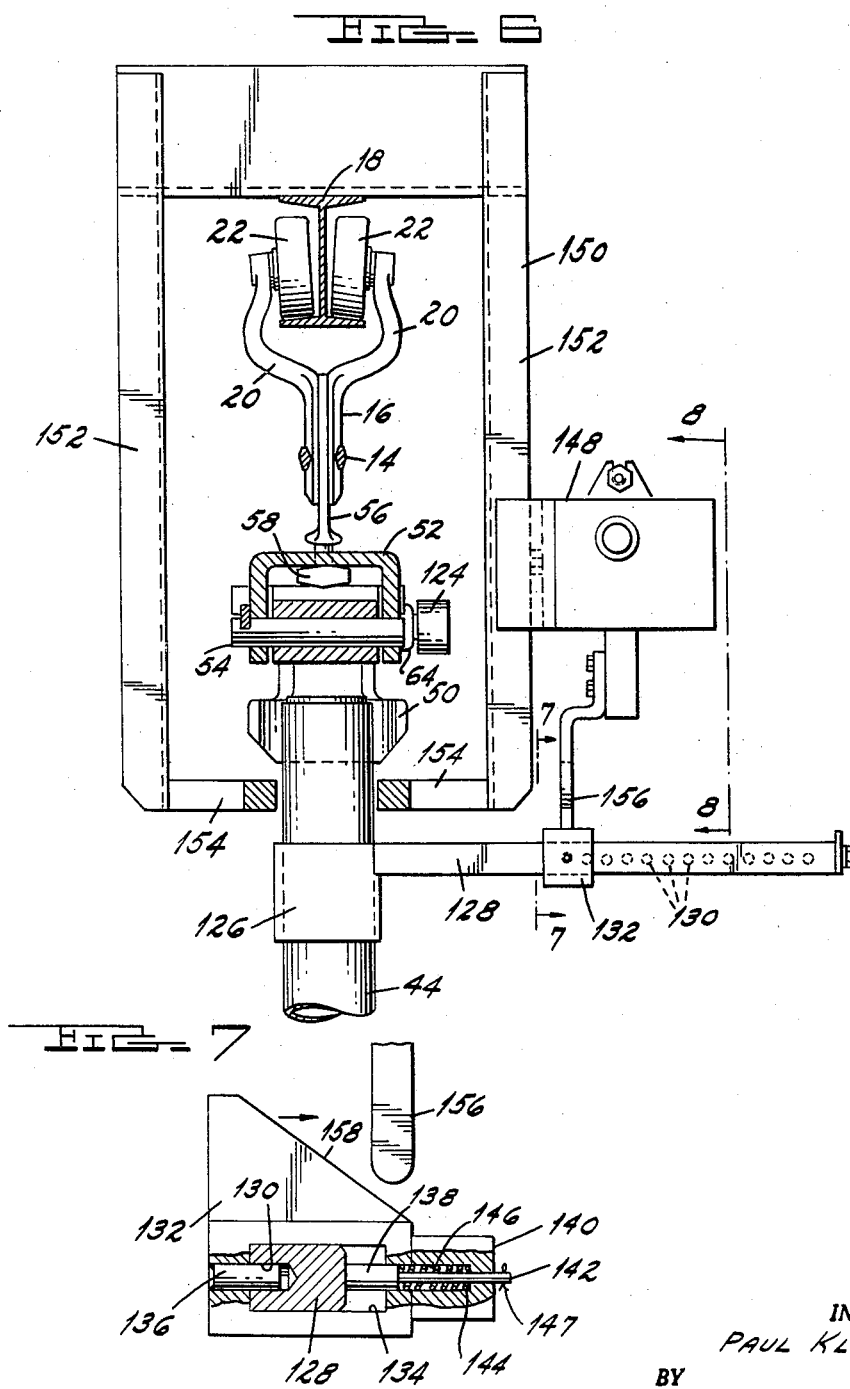
INVENTOR.
PAUL KLAMP
BY
Whittemore, Hulbert & Belknap
ATTORNEYS

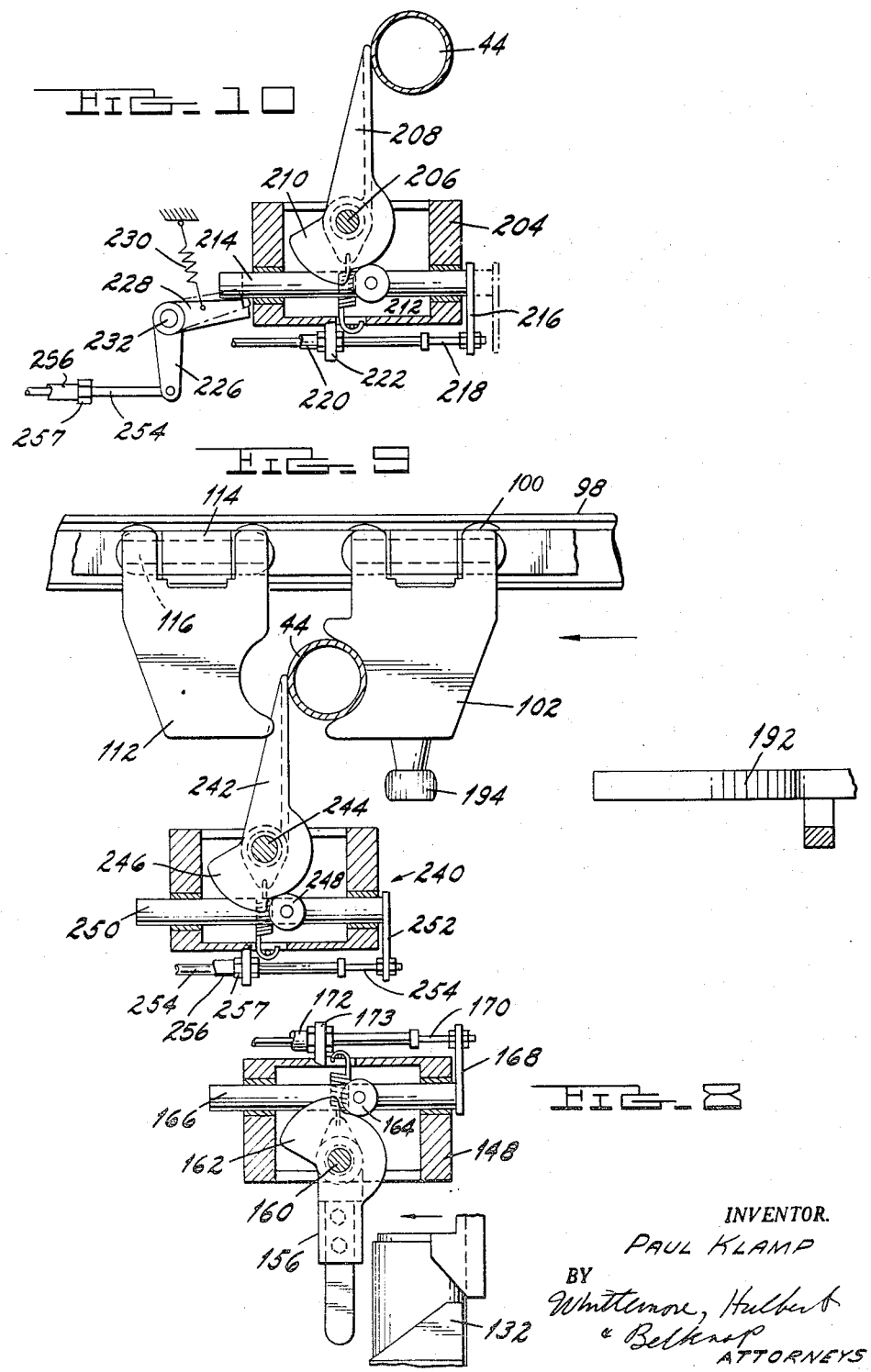

Aug. 23, 1960
P. KLAMP
2,949,862
OVERHEAD TRUCK PUSHER CONVEYOR
Filed Dec. 5, 1955
6 Sheets-Sheet 6
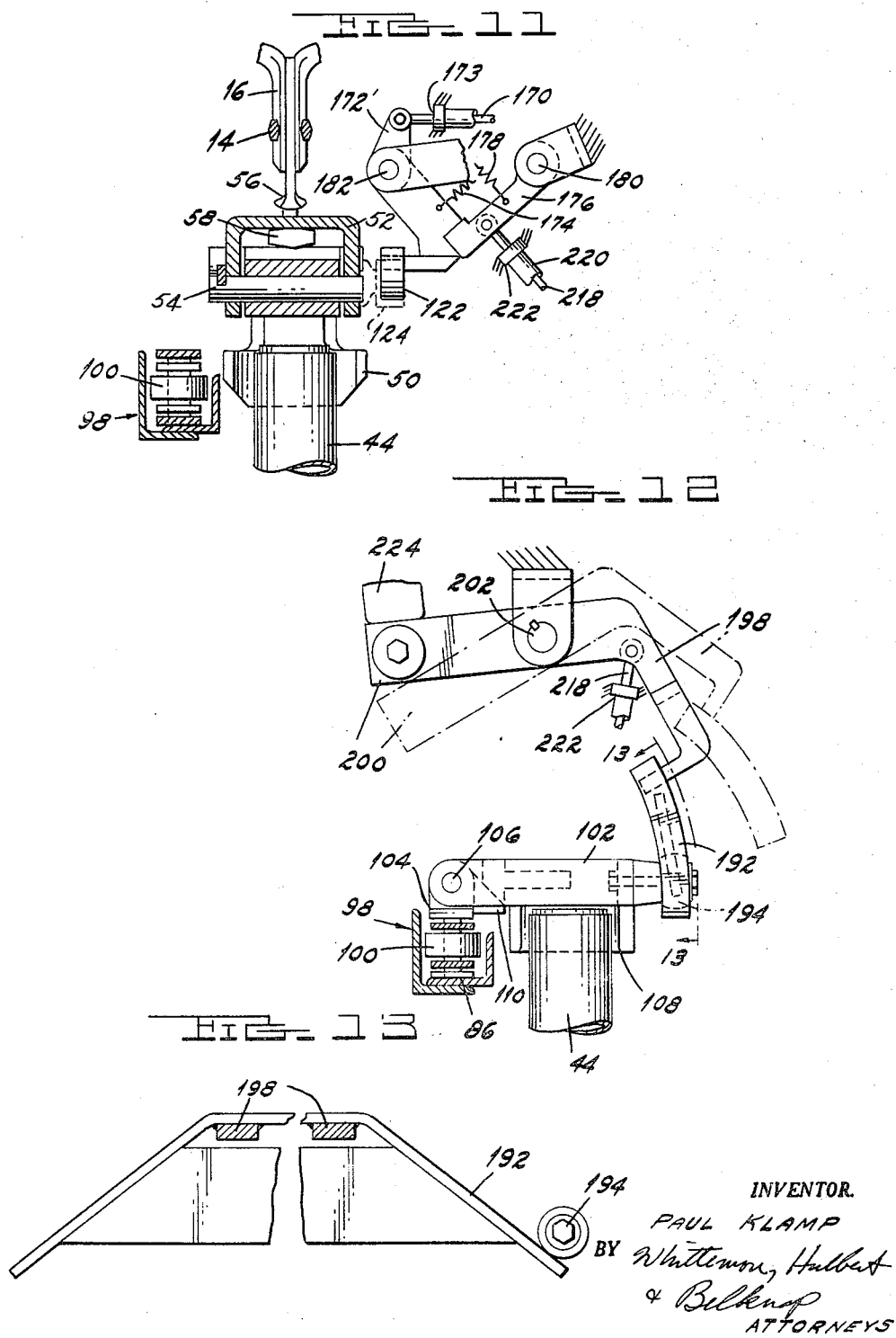
INVENTOR.
PAUL KLAMP
BY Whittemore, Hulbert
& Belknap
ATTORNEYS United States Patent Office 2,949,862
Patented Aug. 23, 1960

2,949,862

OVERHEAD TRUCK PUSHER CONVEYOR

Paul Klamp, Detroit, Mich., assignor to Mechanical Handling Systems, Inc., Detroit, Mich., a corporation of Michigan Filed Dec. 5, 1955, Ser. No. 551,088

36 Claims. (Cl. 104—88)

This invention relates to conveyor systems and more particularly to an overhead truck pusher conveyor system.

One object of this invention is to provide a conveyor system having a first conveyor movable along a predetermined path, and means for switching selected work carriers or trucks from the first conveyor to a second conveyor moving along a second path of travel.

Another object of this invention is to provide a conveyor system as described above having means for preventing the overloading of the second or branch conveyor.

A further object of this invention is to provide a conveyor system as described above in which the means for controlling the switching of selected work carriers and the means for preventing the overloading of the second conveyor are mechanically operated. Accordingly, none of the expensive electrical control equipment and air cylinders are required in the operation of the present conveyor system.

Still another object of this invention is to provide an overhead truck pusher conveyor enabling a maximum loading height of the work carrier.

Other objects of the invention will become apparent as the following description proceeds, especially when taken in conjunction with the accompanying drawings, wherein:

Figure 1 is a diagrammatic plan view of a conveyor system constructed in accordance with the present invention.

Figure 2 is an enlarged diagrammatic view of a portion of the system shown in Figure 1, illustrating the main line of the system and a branch line.

Figure 3 is a side elevational view of one of the work carriers or trucks adapted to be advanced by the conveyor system herein described, showing also the driving connection between a pusher dog on the main conveyor and the mast of the truck, this view looking in the direction of the arrow 3 on Figure 2.

Figure 4 is a side elevational view of the conveyor system at the switching point between the main conveyor and a branch conveyor, this view being taken in the direction of the arrow 4 on Figure 2.

Figure 5 is a top plan view of the structure shown in Figure 4.

Figure 6 is a sectional view taken along the line 6—6 on Figure 2.

Figure 7 is a sectional view taken along the line 7—7 on Figure 6.

Figure 8 is a sectional view taken along the line 8—8 on Figure 6 showing a signal box in advance of the switching region of the main line.

Figure 9 is an enlarged plan view partially in horizontal section, of one of the signal stations shown along the branch line in Figure 2.

Figure 10 is a similar enlarged view of another of the signal stations shown along the branch line in Figure 2.

Figure 11 is a sectional view taken along the line 11—11 on Figure 2.

Figure 12 is a sectional view taken along the line 12—12 on Figure 2.

Figure 13 is a sectional view taken along the line 13—13 on Figure 12.

Referring now more particularly to the drawings and especially to Figure 1 thereof, the conveyor system therein illustrated comprises a main line 10 and a plurality of branch lines 12 associated with the main line at spaced intervals therealong. The main line is in the form of a closed loop or circuit and those work carriers or trucks which are not selected for switching into one of the branch lines merely circulate continuously about the closed circuit of the main line. A conveyor chain 14 is provided for moving the trucks along the main line, the chain, of course, being in the form of a closed loop coincident with the path of the main line. The chain may be of the ordinary pivoted link type and it is supported at spaced intervals throughout its length by the pairs of hangers 16 supported upon the track 18 which overlies the chain 14 throughout its entire extent. Track 18 may be supported in the building in which the system is installed in any suitable manner. As seen, particularly in Figure 6, the track 18 is of I-beam cross-section and the hangers 16 have the upwardly extending laterally spaced arms 20 with rollers 22 respectively carried by the upper ends of the arms and having rolling engagement with the top surface of the lower flange of the track 18 at opposite sides of the web.

The chain 14 is continuously driven in any suitable manner. As shown diagrammatically in Figure 1, a crawler type conveyor 24 is employed for driving the chain 14 having the spaced sprockets 26 and 28 around which extends the chain 30 provided with the dogs 32 at spaced intervals therealong for engagement with certain links of the chain 14 to drive the latter. The conveyor 24 may, for example, be powered by an electric motor.

The work carriers are in the form of trucks generally indicated at 34. As shown, particularly in Figure 3, each truck has a horizontally extending rectangular platform 36 supported upon the floor 38 of the building in which the conveyor system is installed by the laterally spaced rollers 40 at the rear of the platform and the laterally spaced casters 42 at the front of the platform. Articles to be transferred by the conveyor system are loaded upon the top surface of the platform. Rigidly secured to the front end portion of the platform of each truck is an upwardly extending mast 44. The upper end of this mast is adapted to be engaged by the pusher dogs 50 provided at spaced intervals along the chain 14 whereby the trucks may be moved about the main line by the main conveyor.

Each pusher dog 50 is pivotally supported upon a plate 52 of inverted channel section by a pin 54 which extends transversely of the channel and of the path of the main line and has its opposite ends supported in the legs of the channel. Each plate 52 is supported by a pair of spaced hangers 16. As shown in Figures 4 and 11, the hangers are provided with depending portions 56 each having at its lower end the laterally extending part 58 which projects laterally in opposite directions beyond the portion 56. These portions 56 and their lower ends project into the elongated openings 60 in the base or web of the channel shaped plate 52, the width of the openings 60 being less than the length of the lateral parts 58 so that the plate is supported by the hangers. The length of the openings 60 is greater than the length of the parts 58 enabling the parts 58 to be inserted into the openings 60 by merely rotating the hangers before mounting the same on the track 18.

The pusher dogs 50 have rather deep throats as indicated at 62 in Figure 5 to prevent the trucks from slipping away sidewise from the dogs. The pusher dogs 50 normally assume the position shown in Figure 4 in which position they are engageable with the tops of the masts 44 to advance the trucks about the main line. The pusher dogs are weighted to assume this position. Latch levers 64 prevent the pusher dogs from swinging in a counterclockwise direction as viewed in Figure 4 and thereby riding over the top of the mast 44 and releasing the truck. Each lever is pivotally mounted upon the plate 52 by a pin 66 extending parallel to the pin 54 and has a latching arm 68 which engages a portion of the pusher dog. The latch lever 64 is normally weighted to turn in a clockwise direction from the position shown in Figure 4. When the pusher dog is released by the latch lever it will then, of course, ride over the top of the mast 44 and thereafter will return to substantially the position shown in Figure 4, being limited from further clockwise rotation by the lug 70 upon the dog which engages the web of plate 52. Thereafter, when the latch lever 64 is released by the cam 122 (described in detail hereinafter) and returns to the latching position illustrated, following the return of the pusher dog to the Figure 4 position, it will latchingly engage the pusher dog in position for engagement with another truck. The manner in which this is accomplished is explained more fully below.

Also mounted on each plate 52 is a hold back dog 72 supported for rotation upon a pin 74 extending parallel to the pin 54 and having its opposite ends supported in the legs of the channel plate 52. The dog 72 is weighted to turn in a clockwise direction from that shown in Figure 4 but is prevented from further clockwise movement by engagement of the integral lug 76 thereon with the web of channel plate 52. Assuming the main conveyor chain 14 is moved in the direction of the arrow in Figure 4, when it overtakes a truck the hold back dog 72 will ride over the top of the mast 44 to enable the mast to be engaged in the throat of the pusher dog 50.

The branch lines 12 are all identical in every detail including the overload and switching controls and therefore only one of the branch lines will be described in detail. It will be seen that a transfer conveyor 76 (Figs. 2 and 5) is associated with each branch line, the transfer conveyor comprising the spaced sprockets 78 (Fig. 5) and 80 (Fig. 2) respectively supported upon spaced shafts 82 and 84 (Fig. 2) and having a pivoted link type conveyor chain 86 extending around the sprockets. The portion of the chain 86 between the sprockets and adjacent to the main line substantially coincides with the path of the branch line 12.

The transfer conveyor 76 is driven by and at the same speed as the main conveyor 14. As seen in Figures 4 and 5, a crawler type conveyor 88 having the spaced sprockets 90 and 92 and the pivoted link type conveyor chain 94 extending around the sprockets 90 and 92 is driven by the main chain 14 by reason of the lugs 96 on certain of the links of chain 94 engaging between certain of the links of chain 14. Since the sprockets 78 of the transfer conveyor and 92 of the caterpillar conveyor 88 are both keyed to the shaft 82, it will be apparent that the transfer conveyor will move at the same rate of speed and be driven by the main conveyor 14 through the caterpillar conveyor 88.

The conveyor chain 86 is supported throughout its length by the channel shaped track 98 shown in Figure 12. It will be noted that the chain 86 has rollers 100 supported on the pivot pins between the links for rotation about vertical axes to decrease the amount of friction between the chain and the track. At spaced intervals along the track the chain 86 is provided with pusher dogs 102. These pusher dogs are supported upon brackets 104 carried by chain 86 and are connected to the brackets by pivot pins 106 which extend in the direction of length of the chain. The pusher dogs 102 have rather deep throats 108 for engagement with the tops of the masts 44 and are weighted to swing in a clockwise direction to the position shown in Figure 12, being prevented from further clockwise swinging beyond the Figure 12 position by reason of the engagement of the lower side of the pusher dog with the abutment 110 carried by bracket 104.

Associated with each pusher dog and slightly in advance thereof is a hold back dog 112 (Figures 4, 5 and 9). The hold back dogs are supported upon brackets 114 mounted upon the chain 86, being pivotally connected thereto by the pivot pins 116 extending in the direction of length of the chain. These hold back dogs are weighted to normally swing downwardly to the position shown in Fig. 4, being prevented from further downward swinging by a stop similar to the stop on the pusher dogs 102. However, the forward surface 118 of each hold back dog is inclined to enable it to swing upwardly when overtaking and engaging the top of a truck mast to enable the mast to be engaged by the pusher dog 102.

As pointed out above, only selected trucks are switched to one of the branch lines. In order for a truck to be transferred or switched from the main line to a branch line, it is necessary first to release the truck from engagement with the pusher dog 50 which is advancing it along the main line. Release mechanism for accomplishing this transfer purpose is indicated at 120. This release or transfer mechanism comprises a cam 122 which in the operative position thereof, as shown in Figure 4, is disposed for engagement by the roller 124 carried by the latch lever 64. The cam surface has a central horizontal portion and downwardly tapering portions at the front and rear ends. As the roller 124 engages and rolls up over the top side of cam 122, it releases the pusher dog 50 so that it will thereupon ride over the top of the mast 44 of the truck being advanced as the truck slows down. The length of the cam is such that it maintains the latch roller 124 elevated and thus the pusher dog released until the dog bypasses the truck. Ordinarily the cam 122 is held retracted from the Figure 4 position, and in a position in which it will not be engaged by the roller 124 as the individual pusher dogs 50 advance therealong. Accordingly, unless the rollers 124 come into engagement with the cams 122, the trucks advanced by the work carriers will continue to circulate around the main line.

Referring now to Figures 6 and 7, it will be seen that the mast 44 of each truck has secured thereon a sleeve 126 and rigidly secured to the sleeve and projecting laterally outwardly therefrom is an arm 128. The arm 128 has a series of uniformly spaced openings 130 in the rear face thereof. A block 132 has a laterally extending through passage 134 enabling the arm 128 to be slidably received in the passage of this block. A pin 136 secured to the block projects into the passage 134 for engagement with any one of the holes 130 to selectively position the block along the length of the arm. In order to prevent the block 132 from accidentally shifting its position, it will be noted that the block carries a plunger 138 engageable with the front surface of the arm 128 and projecting through an opening in the front of block 132. An extension part 140 secured to the front side of block 132 has a through passage for receiving the reduced end 142 of the plunger and a spring 144 disposed in the enlarged portion 146 of the opening in the extension block bears against the shoulder between the plunger and the reduced extension to secure the block in selective position on the arm. A cotter pin 147 may be provided on the reduced end 142 to prevent the plunger 138 from being removed from the block.

Referring to Figures 2, 6, 7 and 8, it will be noted that a signal box 148 is provided somewhat in advance of the release mechanism 120. The signal box 148 is supported on a guide frame 150 carried by the track 18 and having sides 152 provided at their lower ends with inwardly extending plates 154 adapted to laterally confine and thereby guide the movement of the mast 44 as it moves past signal box 148. Assuming that the block 132 is in the Figure 6 position, it will be engaged by the lower end of the control or signal lever 156 of signal box 148, the forward face of block 132 being inclined as shown at 158 to enable the lever 156 to ride over it smoothly. As the lever 156 is pivoted about its supporting pivot pin 160 mounted in the box 148, a cam lug 162 on the lever engages the projection 164 secured to rod 166, the latter being slidably supported in aligned openings of box 148. A bracket 168 secured to one end of the rod has fastened thereto one end of a push-pull cable 170. The push-pull cable 170 is of flexible metallic material and is supported in a flexible rubber tube 172, the opposite ends of the rubber tube being fixed against movement as indicated at 173 and the cable 170 being axially shiftable within the tubing. When the lever 156 is shifted by engagement with block 132 as described above, the cable 170 is pulled to the right as viewed in Figures 8 and 11. The opposite end of cable 170 (Figure 11) is connected to one arm of the bell crank 172', the other arm of the bell crank having the cam 122 fixedly secured thereto. The movement of the cable 170 to the right causes the bell crank 172' to rotate clockwise to the Figure 11 position against the action of the tension spring 174, where it is latched against return movement by a latch lever 176 which is urged in a clockwise direction by a tension spring 178. The latch lever 176 is pivoted for rotation on a fixed support by a pin 180 parallel to the fixed pin 182 which rotatably supports the bell crank 172'. The cam 122 being held in its operative position of Figure 11, the roller 124 will ride over the top surface thereof to release the pusher dog 50 and thereby release the truck from the main conveyor. Of course, if the block 132 is located in some other position along the arm 128, the truck will not be switched.

The space between the pusher dogs 50 on the main conveyor 14 is exactly the same as the spacing between the pusher dogs 102 on the branch conveyor 76, and the pusher dogs on the branch conveyor are arranged so as to closely follow the respective pusher dogs on the main conveyor in the switching region where these conveyors substantially coincide in direction of travel (see Figures 4 and 5). Accordingly, when the mast of a particular truck is released from the main conveyor, it is promptly picked up by a pusher dog of the branch conveyor. In this connection, it will be noted that the pusher dogs on the branch conveyor engage the mast at substantially the same point as do the pusher dogs on the main conveyor so that for a given mast height, a maximum loading height of the truck is permitted. If the pusher dogs 102 engaged the mast at a lower level, for example, that would decrease the loading height of the truck. Since the trucks are initially released by the main conveyor, it is thus feasible to have the mast engaged by the pusher dogs of the transfer conveyor at the same point as they are engaged by the pusher dogs of the main conveyor.

Referring to Figure 2, it will be noted that there are four stations A–D located along the branch line. A truck which has been switched to the transfer conveyor of the branch line will, assuming that the branch line is completely empty, be carried to an endmost station, represented by station D, where it will be released and will come to rest within a short distance after its momentum has been spent. The release of the truck from the transfer conveyor is accomplished by a release mechanism 190. The release mechanism 190 is in the form of a fixed cam 192 disposed in the path of the rollers 194 upon the pusher dogs 102, causing the pusher dogs to be pivoted upwardly as they pass the fixed cam 192 to release the mast 44 of the truck. The cam surface has a horizontal central portion and downwardly inclined portions at the ends. The dog 102 is held in an elevated position long enough that it will bypass the mast 44 before it drops off the cam. During this time the truck will coast to a stop within a short distance. Succeeding dogs will not engage the truck mast, being elevated by the cam 192 and held elevated until they pass the truck occupying station D.

The next time a truck is switched to the branch line, it will be conveyed to station C where it will be released by release mechanism 196. The release mechanism 196 comprises a cam 192 which is exactly like the fixed cam at station D but which is movable from an operative position in which it will effect the release of the truck to a retracted or inoperative position. As shown in Figures 12 and 13, the cam 192 at station C is carried by an arm 198 and the arm has a weighted portion 200 disposed to effect a turning of the arm 198 about the fixed pivot pin 202 in a counterclockwise direction to the retracted dotted line position shown in Figure 12. However, when a truck occupies station D the arm 198 is swung clockwise to the solid line position of Figure 12 in which the cam 192 moves into operative relation with respect to the rollers 194 of pusher dogs 102 to effect the release of the truck at station C.

Referring to Figures 2 and 10, a signal box 204 is shown at station D located slightly in advance of the release mechanism 190. Pivotally supported on the box 204 by a pin 206 is a control or signal lever 208, the end of which is engageable with the mast 44 of a truck moving along the branch line. The arm 208 has a cam lug 210 thereon engageable with a projection 212 upon a rod 214 slidable in aligned apertures in the box. A bracket 216 connects one end of the rod 214 to one end of the push-pull cable 218 which is like the cable 170 and is supported for axial sliding movement in the flexible rubber tube 220 whose opposite ends are fixed as indicated at 222. Engagement of the arm 208 by mast 44 is effective to shift the push-pull cable 218 to the right as viewed in Figure 10 and downwardly as viewed in Figure 12, to pull the cam 192 at station C to the solid line position. Further rotation of the cam 192 beyond the solid line position is prevented by stop 224. A bell crank 226 (Figure 10) has a latching arm 228 urged in a counterclockwise direction by tension spring 230 about the mounting pin 232 so that the latching arm will prevent return movement to the left of the rod 214 after the truck has passed signal box 204. Hence the cam 192 at station C will remain in the operative position indefinitely to release the second truck switched to the branch line at station C.

The release mechanisms at stations A and B are exactly the same as that described in connection with station C and accordingly are identified by the same reference characters. Moreover, the signal stations B and C have signal boxes 204 exactly like the one at station D located slightly in advance of their respective release mechanisms for controlling the position of the release mechanisms at the preceding stations. Hence it will be apparent that when stations C and D are occupied, the next truck transferred to the branch line will be released at station B and the following truck will be released at station A. The signal box 204 at station A is exactly like the other signal boxes but in this instance, it controls the position of the release mechanism 120 at the switching point between the main line and the branch line.

Referring to Figures 2, 10 and 11, it will be seen that the cable 218 from the signal box 204 at station A is connected to the latch lever 176 of the release mechanism 120 and when a truck actuates the lever arm of this signal box, a tension is placed upon cable 218 to withdraw the latch lever so that it is thereafter ineffective to retain the cam 122 in operative position. The tension will be retained upon the cable 218 by reason of the latch 228 holding the rod 214 in the dotted line position of Figure 10.

Accordingly, when the station A is occupied, and this occurs when stations B, C and D are also occupied, the latch lever 176 is withdrawn and thereafter the cam 122 will return to its inoperative position after being shifted to operative position by reason of the approach of a truck selected for transfer. Thus when a truck selected for transfer reaches the release mechanism 120, the cam will have returned to inoperative position.

When a truck occupying station D is removed from station D it moves past the signal box 240. Referring to Figure 9, the signal box 240 has a control or lever arm 242 which is engageable with the mast of a truck moving beyond station D. In Figure 9 the truck is shown being advanced by a pusher dog 102 but it will be understood that in many instances the truck might be advanced manually. However, it might also be advanced by the pusher dogs which will engage the mast after the truck has been manually advanced past the fixed cam 192 at station D. The arm 242 is mounted for rotation on a pin 244 mounted on signal box 240 and when the arm is engaged by the mast of a truck, the cam lug 246 thereon engages projection 248 on rod 250 which is axially slidable in aligned apertures of the signal box. A bracket 252 connects one end of the rod 250 to one end of pull-push cable 254, of the same construction as cable 170, which is supported in a rubber tube 256 and axially slidable relative thereto. The tubing is fixed at its ends as shown at 257. The other end of the cable 254 is connected to one arm of the bell crank 226 to withdraw the latch 228 and release the tension on the cable 218 of the signal box 204 at station D to thereby release the release cam at station C.

The signal boxes 240 at stations A, B and C are exactly the same as the one previously described. Each signal box 240 is employed to release the tension on the cable associated with the signal box 204 at the corresponding station.

The operation of the conveyor system should be readily apparent from the foregoing. Trucks that are not selected for transfer to the branch line, that is, those in which the block 132 on the mast arm is located in some position other than the one shown in Figure 6, simply circulate about the main line. Trucks designated for transfer operate the signal box 148 in advance of the release mechanism 120 at the point of switching to shift the cam 122 to operative position shown in Fig. 11 and the latch lever 176 operates to retain the release mechanism 120 in operative position. Accordingly, the designated truck is released and thereafter picked up by the dogs of the transfer conveyor and it is moved all the way to station D where it is released by the fixed cam 192. Subsequent trucks are released at stations C, B and A in that order.

Any trucks designated for transfer after all stations A-D are occupied will not be transferred to the branch line since the release mechanism 120 will return immediately to a retracted position following movement to operative position upon actuation of the signal mechanism 148 by the designated truck. This is due to the fact that the latch 176 will be withdrawn by the action of signal box 204 at station A. When the truck occupying station D is removed, it moves past signal box 240 to release signal box 204 at station D, thereby permitting the release mechanism at station C to move to normal inoperative position so that the pusher dogs on the branch conveyor may pick up the truck at station C and transfer it to station D. The movement of the truck past the signal box 240 at station C releases the signal box 204 at station C to shift the release mechanism 196 at station B to inoperative position whereupon the truck occupying station B is transferred to station C. In like manner, the truck occupying station A is transferred to station B. Movement of the truck past the signal box 240 at station A releases the signal box 204 at station A to release the tension on cable 218 to the latch lever 176 associated with the release mechanism 120 at the switching point so that subsequent trucks designated for transfer to the branch line may be thus transferred to occupy the empty station A.

What I claim as my invention is:

1. In a conveyor system, a first conveyor comprising a first linear member movable along a predetermined path of travel, dogs on said first linear member spaced apart lengthwise thereof and releasably engageable with work carriers to be advanced by said member, release mechanism adjacent said path of travel for releasing selected carriers from said dogs, means for moving said release mechanism to operative position including a member actuated by the selected work carriers in advance of said release mechanism and having a direct mechanical connection with said release mechanism, spring biased detent means for holding said release mechanism in operative position, a second conveyor comprising a second linear member movable along a second path of travel, a portion of said second path of travel substantially coinciding with a portion of said first path of travel generally in the region of said release mechanism, means for driving said linear members in synchronism, said second linear member having other dogs thereon spaced apart lengthwise thereof, said other dogs being arranged and positioned on said second linear member to follow closely behind the respective first-mentioned dogs in the region of coincidence of said paths of travel to enable said other dogs to engage work carriers released by the dogs on said first linear member and advance the released carriers along said second path of travel, means for moving said release mechanism to inoperative position including a resilient element connected thereto, a first control member having a direct mechanical connection with said detent means and being actuated by work carriers moved along said second path of travel by said second linear member and moved to a position to retract said detent means against the action of said spring to enable said resilient element to shift said release mechanism as aforesaid, detent means for said control member to hold the same in the position aforesaid to retain said first-mentioned detent means retracted, and a second control member having a direct mechanical connection with said second-mentioned detent means and operated by work carriers moving along said second path of travel by said second linear member beyond said first control member for retracting said second-mentioned detent means.

2. A conveyor system as defined in claim 1, including a second release mechanism between said control members for releasing carriers from said other dogs.

3. A conveyor system as defined in claim 2, said second release mechanism being normally biased to inoperative position, a third control member beyond said second control member having a direct mechanical connection with said second release mechanism and engaged and moved to a position by work carriers moving along said second path of travel by said second linear member to move said second release mechanism to operative position, detent means for holding said third control member in the position aforesaid, fourth control means having a direct mechanical connection with said last-mentioned detent means and operated by work carriers moved along said second path of travel by said second linear member beyond said third control member for retracting said last-mentioned detent means, and a third release mechanism between said third and fourth control members for releasing carriers from said other dogs.

4. In a conveyor system, means for moving work carriers along a predetermined path of travel, a plurality of mechanisms at spaced intervals along said path of travel for stopping the work carriers, control means along said path of travel in advance of each mechanism and operated by carriers moving along said path of travel to render operative the mechanism beyond the same, and additional control means along said path of travel located beyond each mechanism and operated by the carriers moving along said path of travel to render inoperative the first-mentioned control means in advance of the last-mentioned mechanism.

5. A conveyor system comprising a first conveyor for moving objects along a first path of travel, and a second conveyor traveling in a path convergent to that of said first conveyor, said respective conveyors each having members movably mounted thereon and engageable with objects to propel the latter along said respective paths, and means mechanically operated by objects traveling said respective paths for effecting the transfer of said objects from one path to another, comprising means to move said members relative to the respective conveyors and into and out of propelling relation to said objects, thereby to control said transfer, and a device adjacent the zone of convergence of said conveyors operable to control said transfer, said objects having means selectively positionable thereon to engage and selectively operate said device.

6. A conveyor system comprising a first endless conveyor for moving objects along a first path of travel, a second endless conveyor to move objects along a second path of travel, said paths including a transfer zone at which said conveyors are in convergent relation to one another, a transfer mechanism adjacent said zone movable to and from position in which it causes transfer of objects from said first conveyor to said second conveyor for movement by the latter along said second path, a signal device engageable and operated by selected objects moving in said first path toward said transfer mechanism, means operatively connecting said signal device with said transfer mechanism whereby, upon said operation of the device, to position the mechanism for transfer of objects to said second conveyor, a plurality of control devices disposed along said second path for operation by objects moved along the latter, and means operatively connecting said control devices with said transfer mechanism to control the transfer and travel of said selected objects along said second path and in the zone of each of said control devices.

7. A conveyor system comprising a first endless conveyor for moving objects along a first path of travel, a second endless conveyor to move objects along a second path of travel, said paths including a transfer zone at which said conveyors are in convergent relation to one another, a transfer mechanism adjacent said zone movable to and from position in which it causes transfer of objects from said first conveyor to said second conveyor for movement by the latter along said second path, a signal device engageable and operated by selected objects moving in said first path toward said transfer mechanism, means operatively connecting said signal device with said transfer mechanism whereby, upon said operation of the device, to position the mechanism for transfer of objects to said second conveyor, a plurality of control devices disposed along said second path for operation by objects moved along the latter, and means operatively connecting said control devices progressively with one another and with said transfer mechanism to control the transfer and travel of said selected objects along said second path and in the zone of each of said control devices.

8. A conveyor system comprising a first endless conveyor for moving objects along a first path of travel, a second endless conveyor in driving engagement with and positively driven uni-directionally by said first conveyor to move objects along a second path of travel, said paths including a transfer zone at which said conveyors are in convergent relation to one another, a transfer mechanism adjacent said zone movable to and from position in which it causes transfer of objects from said first conveyor to said second conveyor for movement by the latter along said second path, a signal device engageable and operated by selected objects moving in said first path toward said transfer mechanism, means operatively connecting said signal device with said transfer mechanism whereby, upon said operation of the device, to position the mechanism for transfer of objects to said second conveyor, a plurality of control devices disposed along said second path for operation by objects moved along the latter, and means operatively connecting said control devices with said transfer mechanism to control the transfer and travel of said selected objects along said second path and in the zone of each of said control devices.

9. A conveyor system comprising a first endless conveyor for moving objects along a first path of travel, a second endless conveyor to move objects along a second path of travel, said paths including a transfer zone at which said conveyors are in convergent relation to one another, a transfer mechanism adjacent said zone movable to and from position in which it causes transfer of objects from said first conveyor to said second conveyor for movement by the latter along said second path, a signal device engageable and operated by selected objects moving in said first path toward said transfer mechanism, means operatively connecting said signal device with said transfer mechanism whereby, upon said operation of the device, to position the mechanism for transfer of objects to said second conveyor, a plurality of control devices disposed along said second path for operation by objects moved along the latter to cause halting of an object moved by said second conveyor in said second path, means operatively connecting said control devices with one another to control the travel of said selected and transferred objects along said second path, and means operatively connecting one of said control devices with said transfer mechanism to cause the same to be out of said transfer position when said control device is in object halting condition.

10. A conveyor system comprising a first endless conveyor for moving objects along a first path of travel, a second endless conveyor to move objects along a second path of travel, said paths including a transfer zone at which said conveyors are in convergent relation to one another, a transfer mechanism adjacent said zone movable to and from position in which it causes transfer of objects from said first conveyor to said second conveyor for movement by the latter along said second path, a signal device engageable and operated by selected objects moving in said first path toward said transfer mechanism, means operatively connecting said signal device with said transfer mechanism whereby, upon said operation of the device, to position the mechanism for transfer of objects to said second conveyor, a plurality of control devices disposed along said second path for operation by objects moved along the latter and each including a member movable to and from a position in which it causes halting of an object moved by said second conveyor in said second path, means operatively connecting said control devices with one another to control the travel of said selected and transferred objects along said second path including means for moving said respective members to and from said object halting position thereof, and means operatively connecting one of said control devices with said transfer mechanism to cause the same to be out of said transfer position when said member of said control device is in object halting position.

11. A conveyor system comprising a first conveyor for moving objects along a first path of travel, and a second conveyor traveling in a path convergent to that of said first conveyor, said respective conveyors each having members movably mounted thereon and engageable with objects at the zone of convergence of said paths to propel the objects along said respective paths, and means mechanically operated by objects traveling said respective paths for effecting the transfer of said objects from one path to another, at their zone of convergence, and for controlling the halting of travel of objects in one thereof, comprising means to move said members relative to the respective conveyors and into and out of propelling relation to said objects, thereby to control said transfer, said last named means including a signal device located adjacent each conveyor and adapted to be operated by an object traveling the path of that conveyor, and a control and release mechanism adjacent each conveyor, each mechanism being operatively connected to and actuated in response to operation of at least one of said signal devices to cause a propelling member of one of said conveyors to move out of propelling relation to an object traveling the path thereof, said objects having means selectively positionable thereon to engage and selectively operate one of said signal devices.

12. A conveyor system in accordance with claim 11, in which said conveyors are endless chains, one being drivingly connected to the other for operation thereby and traveling in a path generally tangential thereto.

13. In a conveyor system, a first conveyor comprising a first linear member movable along a predetermined path of travel, dogs on said first linear member spaced apart lengthwise thereof and releasably engageable with work carriers to be advanced by said member, release mechanism adjacent said path of travel for releasing selected carriers from said dogs, a second conveyor comprising a second linear member movable along a second path of travel, dogs on said second linear member spaced apart lengthwise thereof and releasably engageable with work carriers to be advanced by said second linear member, said second linear member having a portion adjacent a portion of said first linear member positioned to enable the dogs thereon to engage work carriers released by the dogs of said first linear member and to advance the carriers along said second path of travel, means having provision to be selectively operated by work carriers moved along said second path of travel by said second linear member and operatively connected to said release mechanism to selectively render the latter inoperative, and a further release mechanism having means adapted to be selectively operated by work carriers advanced along said second path of travel to selectively release said carriers from engagement by a dog of said second linear member.

14. A conveyor system as defined in claim 13, the last mentioned means having a direct mechanical connection with said first named release mechanism.

15. In a conveyor system, a first conveyor comprising a first linear member movable along a predetermined path of travel, dogs on said first linear member spaced apart lengthwise thereof and releasably engageable with work carriers to be advanced by said member, release mechanism adjacent said path of travel for releasing selected carriers from said dogs, means actuated by the selected work carriers in advance of said release mechanism and operatively connected to the latter for rendering said release mechanism operative, a second conveyor comprising a second linear member movable along a second path of travel, dogs on said second linear member spaced apart lengthwise thereof and releasably engageable with work carriers to be advanced by said second linear member, said second linear member having a portion adjacent a portion of said first linear member positioned to enable the dogs thereon to engage work carriers released by the dogs of said first linear member and advance the released carriers along said second path of travel, and means operated by work carriers moved along said second path of travel by said second linear member and operatively connected to said release mechanism to render said release mechanism inoperative.

16. In a conveyor system, a first conveyor comprising a first linear member movable along a first predetermined path of travel, dogs on said first linear member spaced apart lengthwise thereof and releasably engageable with work carriers to be advanced by said member, release mechanism adjacent said path of travel for releasing selected carriers from said dogs, means operatively connected to said release mechanism and actuated by the selected work carriers in advance of said release mechanism for rendering said release mechanism operative, a second conveyor comprising a second linear member movable along a second path of travel, a portion of said second path of travel substantially coinciding with a portion of said first path of travel generally in the region of said release mechanism, means for driving said linear members in synchronism, said second linear member having other dogs thereon spaced apart lengthwise thereof, said other dogs being adjacent a portion of said first linear member positioned on said second linear member to follow closely behind the respective first-mentioned dogs in the region of coincidence of said paths of travel to enable said other dogs to engage work carriers released by the dogs on said first linear member and advance the released carriers along said second path of travel, and control means operated by work carriers moved along said second path of travel by said second linear member and operatively connected to said release mechanism to render said release mechanism inoperative.

17. A conveyor system as defined in claim 16 having additional control means operated by work carriers moved along said second path of travel beyond said first-mentioned control means to render said first-mentioned control means inoperative.

18. A conveyor system as defined in claim 17 having a release mechanism between said first-mentioned control means and said additional control means operative to release the work carriers from said other dogs.

19. In a conveyor system, a first conveyor comprising a first linear member movable along a predetermined path of travel, dogs on said first linear member spaced apart lengthwise thereof and releasably engageable with work carriers to be advanced by said member, release mechanism adjacent said path of travel for releasing selected carriers from said dogs, means for moving said release mechanism to operative position including a member actuated by the selected work carriers in advance of said release mechanism and operatively connected to the latter, a second conveyor comprising a second linear member movable along a second path of travel, dogs on said second linear member spaced apart lengthwise thereof and releasably engageable with work carriers to be advanced by said second linear member, said second linear member having a portion adjacent a portion of said first linear member positioned to enable the dogs thereon to engage work carriers released by the dogs of said first linear member and advance the released carriers along said second path of travel, and control means for moving said release mechanism to inoperative position including a member operatively connected to said release mechanism and actuated by work carriers moved along said second path of travel by said second linear member.

20. A conveyor system as defined in claim 19 including a further mechanism having additional control means operated by work carriers moved along said second path of travel by said second conveyor beyond said first-mentioned control means to render said first-mentioned control means inoperative.

21. A conveyor system as defined in claim 20, in which said further mechanism includes a cam located between said first-mentioned control means and said additional control means, and cam followers associated with and operating the dogs on said second linear member and engageable with and operated by said cam to release said work carriers from the latter dogs.

22. A conveyor system as defined in claim 19, in which said release mechanism includes a cam operatively connected to said first named means, and cam followers associated with and operating said first-mentioned dogs and engageable with and operated by said cam in the operative position of said release mechanism to release said work carriers from said first-mentioned dogs.

23. In a conveyor system, a first conveyor comprising a first linear member movable along a predetermined path of travel, dogs on said first linear member spaced apart lengthwise thereof and releasably engageable with work carriers to be advanced by said member, release mechanism adjacent said path of travel for releasing selected carriers from said dogs, means for moving said release mechanism to operative position to release said carriers, including a member operatively connected to said release mechanism and actuated by the selected work carriers in advance of said release mechanism, spring biased detent means engageable with and releasably holding said release mechanism in operative position, a second conveyor comprising a second linear member movable along a second path of travel, dogs on said second linear member spaced apart lengthwise thereof and releasably engageable with work carriers to be advanced by said second linear member, said second linear member having a portion adjacent a portion of said first linear member positioned to enable the dogs thereon to engage work carriers released by the dogs of said first linear member and advance the released carriers along said second path of travel, and means for moving said release mechanism to inoperative position, including a member for retracting said detent means operatively connected to the latter and actuated by work carriers moved along said second path of travel by said second linear member, said last named member being moved to a position to retract said detent means against the spring bias thereon and cause said release mechanism to move to inoperative position.

24. A conveyor system as defined in claim 23 including a direct mechanical connection between said retracting member and said detent means, detent means engageable with said retracting member to hold the same in the position aforesaid to retain said first mentioned detent means retracted, and means operated by work carriers moving along said second path of travel by said second linear member beyond said retracting member for engaging and retracting the same from holding relation to said second mentioned detent means.

25. A conveyor system as defined in claim 24 in which said release mechanism includes a cam operatively connected to said first named means, and cam followers associated with and operating said first-mentioned dogs and engageable with and operated by said cam in the operative position of said release mechanism to release said work carriers from said first-mentioned dogs.

26. In a conveyor system, a first conveyor comprising a first linear member movable along a predetermined path of travel, dogs on said first linear member spaced apart lengthwise thereof and releasably engageable with work carriers to be advanced by said member, release mechanism adjacent said path of travel for releasing selected carriers from said dogs, means actuated by the selected work carriers in advance of said release mechanism and operatively connected to the latter for rendering said release mechanism operative, a second conveyor comprising a second linear member movable along a second path of travel, dogs on said second linear member spaced apart lengthwise thereof and releasably engageable with work carriers to be advanced by said second linear member, said second linear member having a portion adjacent a portion of said first linear member positioned to enable the dogs thereon to engage work carriers released by the dogs of said first linear member and advance the released carriers along said second path of travel, control means operated by carriers moving along said second path of travel and operatively connected to said release mechanism to render said release mechanism inoperative, a second release mechanism beyond said control means for releasing carriers from the dogs of said second linear member, and a second control means operatively connected to said second release mechanism and operated by carriers moving along said second path of travel beyond said second release mechanism to render said first control means inoperative.

27. A conveyor system as defined in claim 26 including a third control means operated by carriers moving along said second path of travel beyond said second control means to move said second release mechanism to operative position, a third release mechanism beyond said third control means for releasing carriers from the dogs of said second linear member, and a fourth control means operated by carriers moving along said second path of travel beyond said third release mechanism to render said third control means inoperative.

28. In a conveyor system, a conveyor comprising a linear member movable along a predetermined path of travel, said member having parts thereon at spaced intervals therealong for engaging and advancing work carriers, a plurality of release mechanisms at spaced intervals along said path of travel for releasing the work carriers from the parts of said linear member as said carriers pass said mechanisms, control means along said path of travel operatively connected to and located in advance of each mechanism and operated by carriers moving along said path of travel to render operative the mechanism in advance thereof, and additional control means along said path of travel located beyond each mechanism and operated by said carriers moving along said path of travel to render inoperative the first control means in advance of the last-mentioned mechanism.

29. In a conveyor system, a conveyor comprising a linear member movable along a predetermined path of travel, said member having parts thereon at spaced intervals therealong for engaging and advancing work carriers, a plurality of release mechanisms at spaced intervals along said path of travel for releasing the work carriers from the parts of said linear member as said carriers pass said mechanisms, said mechanisms being normally biased to inoperative position, first control means along said path of travel located in advance of each mechanism and operated by carriers moving along said path of travel to move the mechanism in advance thereof to operative position, and second control means along said path of travel located beyond each mechanism and operated by said carriers moving along said path of travel to render inoperative the first control means in advance of the last-mentioned mechanism.

30. A conveyor system as defined in claim 29 in which each of the first control means has a direct mechanical connection with the release mechanism beyond the same, detent means engageable with and holding each first control means in the position aforesaid to maintain said mechanism beyond the same in operative position, and in which each second control means has a direct mechanical connection with the detent means associated with the first control means in advance thereof.

31. In a conveyor system, a first conveyor comprising a first linear member movable along a predetermined path of travel, dogs on said first linear member spaced apart lengthwise thereof and releasably engageable with work carriers to be advanced by said member, release mechanism adjacent said path of travel for releasing selected carriers from said dogs, a second conveyor comprising a second linear member movable along a second path of travel, dogs on said second linear member spaced apart lengthwise thereof and releasably engageable with work carriers to be advanced by said second linear member, said second linear member having a portion arranged and positioned to enable the dogs thereon to engage work carriers released by the dogs of said first linear member and to advance the carriers along said second path of travel, control means having provision to be selectively operated by work carriers moving along said second path of travel and operatively connected to said release mechanism to selectively render said release mechanism inoperative, and additional control means having provision to be selectively operated by work carriers moving along said second path of travel beyond said first-mentioned control means and operatively connected to the latter to selectively render said first-mentioned control means inoperative.

32. A conveyor system as defined in claim 31 including a further release mechanism located between said first-mentioned and additional control means and operatively connected to and operated by the latter to selectively release the work carriers from the dogs on said second linear member.

33. A conveyor system comprising a first endless conveyor chain for moving objects along a first path of travel, and a second endless conveyor chain drivingly connected to said first chain for operation thereby and traveling in a path generally tangential to that of said first chain, said respective chains each having members movably mounted thereon and engageable with objects to propel the latter along said respective paths, and means mechanically operated by objects traveling said respective paths for effecting the transfer of said objects from one path to another, comprising means to move said members relative to the respective chains and into and out of propelling relation to said objects, thereby to control said transfer, said last named means including a signal device located adjacent one conveyor chain and adapted to be operated by an object traveling the path of said one conveyor chain, a transfer mechanism operatively connected to and controlled by said signal device to cause a propelling member of said one chain to move into and out of propelling relation to an object traveling the path thereof, said objects having means selectively positionable thereon to engage and selectively operate said device, and a control device located adjacent the other conveyor chain and operatively connected to and actuated in response to operation of said signal device to cause a propelling member of said other conveyor chain to move out of propelling relation to an object traveling the path thereof.

34. A conveyor system comprising first and second endless conveyor chains having portions in convergent relation to one another, means for continuously driving said first chain, the second chain being operatively connected in driving engagement with the first chain and driven thereby, said chains each having driving dogs thereon spaced along the respective lengths thereof for propelling engagement with objects to be advanced by said chains, the chains being drivingly engaged with one another to cause the dogs of one chain to follow the dogs of the other at the zone of convergence of said portions of the chains, and means for moving the dogs of said chains relative to the same and, relative to said object, into and out of position for driving engagement with the latter, including a device adjacent said zone of convergence operable to control transfer of objects from one chain to the other, said objects having means selectively positionable thereon to engage and selectively operate said device.

35. A conveyor system comprising first and second endless conveyor chains having portions in convergent relation to one another, means for continuously driving said first chain, the second chain being operatively connected in driving engagement with the first chain and driven thereby at equal linear speed, said chains each having driving dogs thereon spaced along the respective lengths thereof for propelling engagement with objects to be advanced by said chains, the chains being drivingly engaged with one another to cause the dogs of the first chain to follow the dogs of the second chain at the zone of convergence of said portions of the chains, the dogs of the respective chains being correspondingly positioned as to elevation for driving engagement at a predetermined elevation with an object, and means for moving the dogs of both of said chains relative to the same and, relative to said object, into and out of position for driving engagement with the latter, including a device adjacent said zone of convergence operable to control transfer of objects from one chain to the other, said objects having means selectively positionable thereon to engage and selectively operate said device.

36. A conveyor system comprising first and second endless conveyor chains having portions in convergent relation to one another, means for continuously driving said first chain, the second chain being operatively connected in driving engagement with the first chain and driven thereby at equal linear speed, said chains each having driving dogs thereon spaced along the respective lengths thereof for propelling engagement with objects to be advanced by said chains, the spacing of the dogs on both chains being equal and the chains being drivingly engaged with one another to cause the dogs of the first chain to follow the dogs of the second chain at the zone of convergence of said portions of the chains, the dogs of the respective chains being correspondingly positioned as to elevation for driving engagement at a predetermined elevation with an object, and means for moving the dogs of both of said chains relative to the same and, relative to said object, into and out of position for driving engagement with the latter, including a device adjacent said zone of convergence operable to control transfer of objects from one chain to the other, said objects having means selectively positionable thereon to engage and selectively operate said device.

References Cited in the file of this patent

UNITED STATES PATENTS

| | | |
|---|---|---|
| 1,000,106 | Morris | Aug. 8, 1911 |
| 1,625,501 | Robertson | Apr. 19, 1927 |
| 1,900,602 | Gotthard et al. | Mar. 7, 1933 |
| 1,903,488 | Stibbs | Apr. 11, 1933 |
| 1,921,109 | Webb et al. | Aug. 8, 1933 |
| 2,022,186 | Butler | Nov. 26, 1935 |
| 2,057,131 | Barton | Oct. 13, 1936 |
| 2,161,388 | Rosenthal | June 6, 1939 |
| 2,335,790 | Ransburg | Nov. 30, 1943 |
| 2,601,477 | Webb et al. | June 24, 1952 |
| 2,612,847 | Burrows | Oct. 7, 1952 |
| 2,660,127 | Boyko et al. | Nov. 24, 1952 |
| 2,688,934 | Quail | Sept. 14, 1954 |
| 2,688,936 | Brooks | Sept. 14, 1954 |
| 2,812,724 | King | Nov. 12, 1957 |
| 2,845,034 | Harrison | July 29, 1958 |
| 2,853,955 | Bishop et al. | Sept. 30, 1958 |